United States Patent [19]

Cesca et al.

[11] 4,037,041

[45] July 19, 1977

[54] PROCESS FOR THE POLYMERIZATION OF ALPHA-OLEFINS, CATALYST EMPLOYED IN SUCH A PROCESS AND METHOD FOR THE PREPARATION THEREOF

[75] Inventors: Sebastiano Cesca, San Donato Milanese; Alberto Greco, Dresano; Guglielmo Bertolini, Pavia; Mario Bruzzone, San Donato Milanese, all of Italy

[73] Assignee: Snam Progetti, S.p.A., San Donato Milanese, Italy

[21] Appl. No.: 562,800

[22] Filed: Mar. 27, 1975

[30] Foreign Application Priority Data

Mar. 28, 1974 Italy .................................. 49831/74

[51] Int. Cl.² .......................... C08F 4/02; C08F 10/02
[52] U.S. Cl. .................................. 526/97; 252/429 C; 526/114; 526/115; 526/116; 526/352
[58] Field of Search ............... 252/429 C; 260/93.7, 260/94.9 B, 94.9 DA, 94.9 E; 526/97, 114, 115, 116

[56] References Cited

U.S. PATENT DOCUMENTS

| | | | |
|---|---|---|---|
| 2,981,725 | 4/1961 | Luft et al. | 526/125 |
| 3,008,943 | 11/1961 | Guyer | 526/97 |
| 3,463,827 | 8/1969 | Banks | 260/94.9 DA |
| 3,598,795 | 8/1971 | Van den Berg | 260/94.9 B |
| 3,745,154 | 7/1973 | Kashiwa | 260/94.9 DA |

*Primary Examiner*—Edward J. Smith
*Attorney, Agent, or Firm*—Ralph M. Watson

[57] ABSTRACT

Ethylene is polymerized through the use of an improved catalyst system consisting of a carrier such as neodymium oxide having a high superficial area, an aluminum compound such as triisobutylaluminum and the combination product of titanium trichloride and an isostructural chloride of another transition metal prepared by impregnating the carrier with a solution of a carbonyl derivative of the other transition metal, refluxing the impregnated carrier with titanium tetrachloride until that carbonyl derivative is converted to the chloride of the other transition metal, and then removing the excess of titanium tetrachloride.

7 Claims, No Drawings

PROCESS FOR THE POLYMERIZATION OF ALPHA-OLEFINS, CATALYST EMPLOYED IN SUCH A PROCESS AND METHOD FOR THE PREPARATION THEREOF

The present invention relates to a process for the polymerization of alpha-olefins, particularly ethylene, by means of a catalyst system constituted by an aluminum alkyl and the combination of a transition metal chloride and titanium trichloride finely dispersed on a material having a high superficial area; moreover it relates to the employed catalyst and also to the method of preparing such a catalyst.

It is known that titanium halides, active from a catalytic point of view, are employed in the low pressure polymerization of alpha-olefins, they being prepared by reducing titanium tetra-halides with aluminium alkyl or alkyl-halide compounds. The reaction is generally carried out under an inert atmosphere and in the presence of an inert solvent. The so obtained catalyst is then used together with metal alkyl compounds for the polymerization of alpha-olefins in suspension in an organic solvent under reasonable pressures of the monomer.

However these titanium halides are impure because of the presence of aluminum compounds and do not show a very high catalytic activity so that the final polymer needs expensive washing operations in order to remove the catalytic residues.

Recently, methods have been proposed according to which titanium halides are carried on inorganic substances so that polymerization catalysts are obtained having an improved effectiveness. For instance they carriers used are selected from magnesium oxide or hydroxide; however it is to be noted that the catalytic activity of the titanium compound, carried on these materials, undergoes substantial changes according to the chemical nature of the surface thereof; therefore such compounds, in many cases, must undergo treatments with Grignard reagents, aluminum alkyl compounds or hydrogen to improve their effectiveness.

One object of the present invention is a process for the polymerization of alpha-olefins by means of a catalytic system which has a high activity and does not need any preliminary treatment of the carrier.

This catalytic system, which is a second subject of the present invention, is constituted by two components, i.e.:

1. aluminum compound selected from the ones having the formula $AlR_3$ or $AlR_xY_{3-x}$ in which R is an alkyl, aryl or cycloalkyl radical, Y is a halogen or H, and $x$ is a number comprised between 1 and 2, and
2. a product derived from the combination of a transition metal chloride with titanium trichloride, such a combination (or association) being finely dispersed on a material having a high superficial area.

These associations are very stable from a chemical point of view since titanium trichloride and the transition metal chloride are isostructural; moreover they contain titanium in the optimum valence state in order to exhibit the best catalytic activity.

They are prepared according to a method, which is a third aspect of the present invention, consisting in impregnating the carrier, previously dehydrated by a thermal treatment, with a low valence transition metal compound, particularly a zero valence one, preferably a carbonyl metal derivative, dissolved in a hydrocarbon solvent, and then in titanium tetrachloride and, finally in removing the excess of this latter from the carrier.

The zero valence transition metal compound may contain ligands of a type different from the carbonyl one, for instance allyl, olefine, carbonic, nitrosyl groups, etc.

During the process volatile substances are developed, particularly, in the case of carbonyl metal compounds, carbon monoxide and the oxidation of the metal and the contemporaneous reduction of titanium tetrachloride to trichloride occur according to the reaction

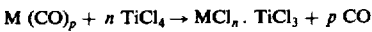

$$M(CO)_p + n\ TiCl_4 \rightarrow MCl_n \cdot TiCl_3 + p\ CO$$

wherein $p$ means the carbonyl number and $n$ means the valence state taken by the transition metal M during its oxidation from titanium tetrachloride.

The material used as carrier for the aforesaid reaction is selected from the rare earth oxides whereas the transition metal is preferably selected from V, Mn, Fe, Co and it is used in an amount ranging from 0.1 to 10% by weight with respect to the carrier weight, preferably from 1 to 3% by weight.

More particularly the material, employed as carrier, is selected from neodymium, lanthanum and cerium oxides, whose availability as is the case with other rare earth compounds, is increasing, they being obtainable, as by-products, from the titanium metallurgy and the nuclear reactors. As noted above, according to the present invention, pretreatments are not necessary since the activity of our catalytic systems is high and homogeneous, even if the chemical nature of the carrier undergoes changes; however such carriers can also be subjected to pretreatments with Grignard reagents or aluminum alkyl-halides so as to further increase the performances thereof.

The activities observed in polymerization are higher than the ones obtained by means of the carriers treated only with $TiCl_4$, the other conditions being the same.

These catalysts show a good behaviour in the presence of hydrogen and, in the case of ethylene polymerization, give rise to a narrow molecular weight distribution.

The polymerization reaction is carried out according to known procedures at temperatures in the range of from 0° to 200° C and at pressures ranging from 0.1 to 50 atmospheres.

The polymerization is carried out in a steel autoclave equipped with an anchor stirrer when the operations are carried out at pressures higher than the atmospheric one. The catalyst is introduced together with the solvent and the metal alkyl compound.

The autoclave being thermostated at the polymerization temperature, $H_2$ and then ethylene are introduced therein under pressure at the desired pressure ratio. The reaction is stopped by adding alcohol to the autoclave.

With particular reference to the examples hereinafter reported, the solvent, the organic metal compound (in concentration equal to 0.2% by volume) and the transition element compounds association, previously prepared as specified, are introduced into the autoclave, thermostated at 85° C. The ethylene pressure is kept constant for the whole test which occupies over six hours. The procedures described in the following examples refer to these working conditions (standard polymerization). The obtained polymers are dried under vacuum to a constant weight before evaluating the yields as polymer.

However the examples, hereinafter reported, only purpose to illustrate our invention, which must not be regarded as limited thereto.

EXAMPLE 1

15 g. of commercial $Nd_2O_3$ were dehydrated by means of an azeotropic distillation with xylene and then suspended in hexane (100 ml) containing 0.5 g of $Mn_2(CO)_{10}$. The hexane solution was evaporated under vacuum and the dry material was refluxed in boiling $TiCl_4$ for a period of 8 hours. After filtration, washing and vacuum drying, the product had the following composition

| | |
|---|---|
| Ti | 1.4% |
| Mn | 0.90% |
| Cl | 5.44% |

230 mg of the catalyst prepared as described above, used in a standard polymerization at relative pressure $H_2/C_2H_4 = 14/7$ atm., produced 265 g of polyethylene having $MF_{2.16} = 5.61$ $MF_{21.6} = 204.26$, $MF_{21.6}/MF_{2.16} = 36.4$, $[\eta]_{decaline}^{135°C} = 1.7$ dl/g and containing 20.8 ppm of Ti + Mn, in which Ti was 12.5 ppm.

EXAMPLE 2

93 mg of the same catalyst described in example 1 were employed in a standard polymerization at relative pressures $H_2/C_2H_4 = 5/10$ atm. 175 g of polyethylene were obtained having $$MF_{21.6} = 10.180, \frac{MF_{21.6}}{MF_{21.6}} = 33.5, [\eta]\ 135°\ C\ decaline\ = 2.5\ dl/g$$

and containing 12.7 ppm of Ti + Mn, in which Ti was 7.6 ppm.

EXAMPLE 3

15 g. of $Nd_2O_3$ of the same type described in example 1 and dehydrated in the same way were added 0.7 g of $V(CO)_4Cp$ in 100 ml of hexane. The solvent was evaporated in a rotating evaporator and the dry residue was refluxed in liquid $TiCl_4$ for 8 hours. A dark violet material was obtained having the following composition

| | |
|---|---|
| Ti | 1.76% |
| V | 1.30% |
| Cl | 7.67% |

103 mg of this catalyst were employed in a standard polymerization test at relative pressures $H_2/C_2H_4 = 10/10$ atm. 180 g of polyethylene were obtained having $MF_{21.6} = 1.257$ and containing 16.6 ppm of Ti+, in which Ti was 9.3 ppm.

EXAMPLE 4

15 g. of $Nd_2O_3$, dehydrated according to the azeotropic distillation method with xylene, were refluxed in $TiCl_4$(100 ml) for 8 hours and then filtered, washed with hexane and dried under vacuum.

The composition of the product was the following one

| | |
|---|---|
| Ti | 0.15% |
| Cl | 1.0% |

231 mg of this product were employed in a standard polymerization, for the sake of comparison with the one disclosed in example 2, at relative pressures $H_2/C_2H_4 = 5/10$ atm. Polyethylene was obtained only as traces.

EXAMPLE 5

228 mg of the product prepared according to example 1 were employed in a standard polymerization test by replacing Al (iso-$C_4H_9$)$_3$ with $AlEt_2Cl$ and working at partial pressures of $H_2$ and $C_2H_4$ equal to 10/10 atmospheres. 85 g of polymer were obtained having $MF_{2.16} = 0.100$, $MF_{21.6} = 4.22$ $MF_{21.6}/MF_{2.16} = 42.2$ and a content of Ti + Mn equal to 64 ppm, in which Ti was 40 ppm.

EXAMPLE 6

15 g of $Nd_2O_3$, dried in a muffle for one night at 400° C, were refluxed with 0.30 ml of $Fe(CO)_5$ in 50 ml of $TiCl_4$ for 8 hours under a nitrogen atmosphere.

The whole was hot filtered, and repeatedly washed with hexane, and then dried under vacuum; a violet product was obtained having the following composition

| | |
|---|---|
| Ti | 1.36% |
| Fe | 0.83% |
| Cl | 5.16% |

210 mg of this product were employed in a standard polymerization of ethylene at partial pressures $H_2/C_2H_4$ equal to 10/10 atmospheres. 265 g of unflowing polymer were obtained containing 17.8 ppm of Ti + Fe, in which Ti was 10.7.

EXAMPLE 7

13 g of $La_2O_3$, dehydrated in muffle for 4 hours at 400° C, were refluxed in 50 ml of $TiCl_4$ with 0.40 g of $Mn_2(CO)_{10}$ for 8 hours. After filtration, washing with hexane, drying under vacuum, a violet product was obtained having the following composition

| | |
|---|---|
| Ti | 0.47% |
| Mu | 0.71% |
| Cl | 4.62% |

240 mg of the so obtained product were employed in a standard polymerization at relative pressures of $H_2/C_2H_4$ equal to 10/10 atmospheres and produced 130 g of polymer having $MF_{2.16} = 0.812$, $MF_{21.6} = 29.8$, $MF_{21.6}/MF_{2.16} = 37$, $[\eta]_{decaline}^{135°C} = 1.9$ and a content of Ti + Mn equal to 21.8 ppm, in which Ti was 7.9 ppm.

EXAMPLE 8

19 g of $CeO_2$, finely powdered, dried in a muffle at 300° C over one night, were refluxed in 50 ml of $TiCl_4$ with 0.5 g of $Mn_2(CO)_{10}$ for 8 hours. The yellow product was hot filtered and, after washing and drying under vacuum, had the following composition

| | |
|---|---|
| Ti | 1.51% |
| Mn | 0.81% |
| Cl | 5.00% |

345 mg of the so obtained product were employed in a standard polymerization at relative pressures of $H_2/C_2H_4$ equal to 10/10 atmospheres. 125 g of polyethylene were obtained having $MF_{2.16} = 0.123$, $MF_{21.6} =$ 9.62, $MF_{21.6}/MF_{2.16} = 76$, $[\eta] = 3.6$ dl/g and a content of Mn + Ti equal to 64.3 in which Ti was 41.7 ppm.

What we claim is:

1. The process of polymerizing an alpha-olefin, wherein the polymerization is carried out in the presence of a catalyst system consisting of a carrier having a high superficial area selected from the oxides of neodymium, lanthanum and cerium, an aluminum compound represented by the formula $AlR_3$ or $AlR_xY_{3-x}$, wherein R is an alkyl, aryl or cycloalkyl radical, $x$ is a number between 1 and 2 and Y is a halogen or hydrogen, and the combination titanium trichloride and an isostructural chloride of another transition metal selected from the group consisting of V, Mn, Co and Fe that is prepared by impregnating said carrier with a solution of a carbonyl of said other transition metal, refluxing the impregnated carrier with titanium tetrachloride to convert said carbonyl into the chloride of said other transition metal, and then removing excess titanium tetrachloride.

2. Process for the polymerization of an alpha-olefin as claimed in claim 1, wherein the other transition metal is present in an amount in the range of from 0.1 to 10% by weight with respect to the carrier weight.

3. Process for the polymerization of an alpha-olefin as claimed in claim 1, wherein the employed olefin is ethylene.

4. Process for the polymerization of an alpha-olefin as claimed in claim 1, wherein the reaction is carried out in the presence of a hydrocarbon solvent.

5. Process for the polymerization of an alpha-olefin as claimed in claim 1, wherein the reaction is carried out in the temperature range of from 0° to 200° C, and in the pressure range of from 0.1 to 50 atmospheres.

6. A catalyst system for the polymerization of an alpha olefin consisting of a carrier having a high superficial area selected from the oxides of neodymium, lanthanum and cerium, an aluminum compound represented by the formula $AlR_3$ or $Al_xY_{3-x}$, wherein R is an alkyl, aryl or cycloalkyl radical, Y is a halogen or hydrogen and $x$ is a number between 1 and 2, and the combination product of titanium trichloride and an isostructural chloride of another transition metal selected from the group consisting of V, Mn, Co and Fe that is prepared by impregnating said carrier with a solution of a carbonyl of said other transition metal, refluxing the impregnated carrier with titanium tetrachloride to convert said carbonyl into the chloride of said other transition metal and then removing excess titanium tetrachloride.

7. Catalyst for the polymerization of an alpha-olefin as claimed in claim 6, wherein the amount of the transition metal is in the range of from 0.1 to 10% by weight with respect to the carrier weight.

* * * * *